United States Patent [19]

Richardson

[11] 4,159,135

[45] Jun. 26, 1979

[54] FLANGE PROTECTOR

[76] Inventor: Ernest T. Richardson, 403 Tournament Blvd., Berwick, La. 70342

[21] Appl. No.: 897,383

[22] Filed: Apr. 18, 1978

[51] Int. Cl.² .............................................. F16L 23/00
[52] U.S. Cl. .................................... 285/336; 285/351; 285/363
[58] Field of Search ............... 285/336, 363, 368, 351; 277/58, 225, 167.3; 138/96 R

[56] References Cited

U.S. PATENT DOCUMENTS

| 627,293 | 6/1899 | Brighton | 285/363 X |
| 930,692 | 8/1909 | Robinson | 285/363 X |
| 2,384,386 | 9/1945 | Malmberg | 285/363 X |
| 2,456,234 | 12/1948 | Young | 285/363 X |
| 3,463,196 | 8/1969 | Richardson | 285/363 X |

FOREIGN PATENT DOCUMENTS

| 707239 | 4/1965 | Canada | 285/336 |
| 1204909 | 8/1959 | France | 285/363 |
| 2258584 | 8/1975 | France | 285/363 |

Primary Examiner—Thomas F. Callaghan

[57] ABSTRACT

Apparatus is disclosed for protecting the end face of an annular blowout preventer or the like from corrosion. In one embodiment, both a ring groove and a circle of tapped stud holes are protected in a low pressure environment by parts on a bell flange to be connected above the annular preventer, and, in another embodiment, the circle of holes is protected in a high pressure environment by the flange of another preventer to be connected above the annular preventer and sealed with respect to the annular preventer by a conventional metal API seal ring.

5 Claims, 4 Drawing Figures

FLANGE PROTECTOR

This invention relates to apparatus for protecting the upper end face of a flange of an annular blowout preventer or the like. More particularly, it relates to improved apparatus for protecting a ring groove and a circle of tapped stud holes in the end face thereof from corrosion.

In the drilling of an oil or gas well, the drill string extends through the bore of one or more blowout preventers supported above the wellhead. Frequently, the uppermost preventer is of the annular type which has a circle of tapped stud holes in the end face of its upper flange for connection with studs for securing additional equipment above it. Also, there is an annular groove in the end face concentrically within the circle of holes for receiving a seal ring between the flange and the additional equipment.

This additional equipment, which may be another annular preventer, has a flange on its lower end with holes through it to receive the studs for connection to the tapped stud holes in the upper flange on the lower preventer. Also, the seal ring is usually a standard metal API ring for forming a pressure-tight connection between the ring groove on the upper flange of the lower preventer and a matching ring groove in the lower flange of the upper preventer.

During drilling operations, a bell flange is normally connected to the upper flange of the uppermost annular preventer, and drilling fluid circulated downwardly through the drill string returns upwardly through the annulus between the string and the preventer bore out through the open upper end of the bell flange. Since this does not require a pressure-tight connection between the flanges, they are normally connected by only a few studs, thereby leaving open the unused tapped holes in the circle of holes on the upper flange of the preventer. Also, if packing is disposed between the ring groove of the flanges, it is of a less permanent nature than the API ring. Under these conditions, it has been found that the holes in the preventer flange and especially the threads thereof, as well as the ring groove of the preventer, may be corroded by the drilling fluid. This requires costly repairs of the equipment and also loss of use of the equipment during the downtime.

Even when the ring groove in the lower preventer is protected against corrosion by a standard API ring, the severe vibrations which occur at the upper end of the wellhead during drilling operations, such as those due to a shell shaker above the bell flange, often cause the ring to deform the groove to such an extent as to render it incapable of holding a seal with the ring. Furthermore, even when another preventer is connected above the lower, annular preventer and sealed with respect thereto by an API ring, the tapped stud holes are subject to damage from drilling mud or other corrosive materials on the outside of the stack. This is especially true if the upper preventer is connected to the annular preventer by less than a full circle of studs, leaving some of the tapped holes unfilled.

An object of this invention is to prevent these parts of the flange from corroding and thereby avoid these costly and time-consuming repairs.

A further object is to provide such apparatus which protects the ring groove against corrosion without damaging same, as during vibrations encountered in drilling operations while the bell flange is mounted above the annular preventer.

These and other objects are accomplished, in accordance with the illustrated embodiments of the present invention, by a flange which is of special construction in that the lower end of the holes therethrough for receiving studs to connect it to the annular preventer are counterbored and filled with a body of resilient material. More particularly, at least some of the bodies of resilient material are bored to closely receive a stud therethrough, and all of them protrude from the end face of the bell flange. Consequently, as the opposed end faces of the upper and lower flanges are drawn together by connection of the studs to the tapped stud holes in the preventer flange, the body of resilient material will sealably engage with the studs and surrounding portions of the end face of the preventer flange, thereby fully protecting the stud holes from corrosion, either from within or without the bore of the preventer.

In one embodiment of the invention, wherein a bell flange is connected above the blowout preventer flange, the end face of the bell flange has a groove formed therein which is filled with a second body for sealing off the ring groove in the blowout preventer flange as the end faces are drawn together. Thus, this second body of resilient material protrudes from the end face of the bell flange and is wider than the ring groove in the preventer so that it will seal with the end face of the preventer flange both inwardly and outwardly of the inner and outer edges, respectively, of the groove in the preventer. More particularly, the second body of resilient material has an extension from the protruding portion thereof which sealably engages with the groove as such end faces are drawn together. Preferably, the extension is a rib having an end wall and tapered side walls corresponding generally to the bottom wall and tapered side walls of the ring groove in the preventer so as to fill the preventer groove and thus sealably engage against all of its walls.

In another embodiment of the invention, wherein the protector flange is on another preventer which is to be connected to the annular preventer in a manner to seal against high pressure, its end face has a conventional ring groove disposable opposite the ring groove in the annular preventer flange. In this way, an API ring of standard construction may be disposed between the opposed ring grooves to form a high pressure seal between the preventer flanges.

In the drawings, wherein like reference characters are used throughout to designate like parts:

Figure 2:
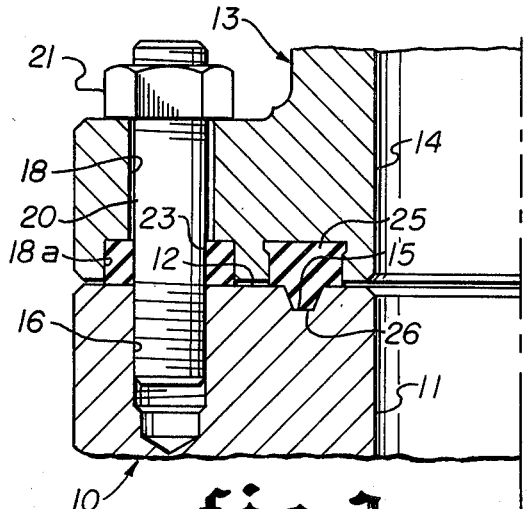
FIG. 2 is a partial vertical sectional view of the flange of FIG. 1 as it is initially lowered onto the end face of the upper flange of an annular blowout preventer.
Figure 3:
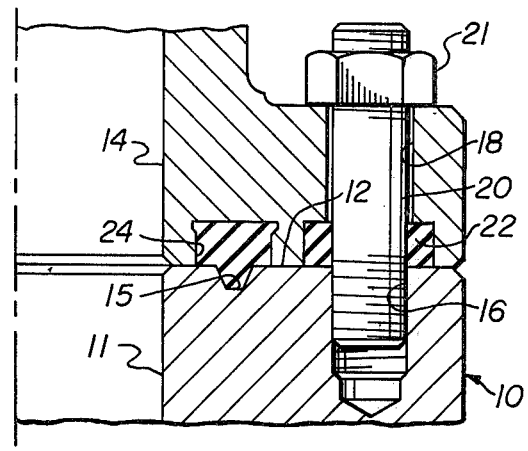
Figure 4:
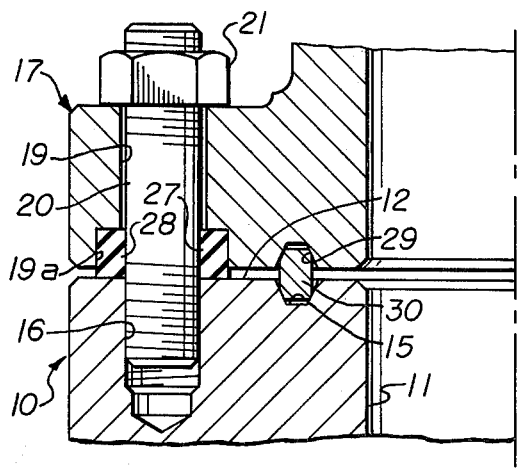

FIG. 3 is a partial vertical sectional view, similar to FIG. 2, but upon full connection of the studs extending through the bell flange to the tapped stud holes in the end face of the preventer so as to expand the bodies of resilient material carried by the lower end face of the bell flange into sealing engagement with the parts of the preventer flange to be protected; and FIG. 4 is a partial vertical sectional view of the second-described embodiment of the invention, wherein the lower flange of an upper blowout preventer is constructed and connected to the upper flange of the annular preventer in a manner to protect such parts of the annular preventer in a high pressure, relatively nonvibratory environment.

With reference now to the details of the above-described drawings, the annular blowout preventer 10 shown in each of FIGS. 2, 3 and 4 may be of any well known type having a bore 11 therethrough and a flange on its upper end having an upwardly facing end face 12. As previously mentioned, in use, the preventer is connected to the upper end of a wellhead, and a drill string is adapted to be extended downwardly through the bore of the preventer. During drilling operations, drilling fluid is circulated downwardly through the drill string and upwardly in the annulus between it and the bore 11.

Figure 1:
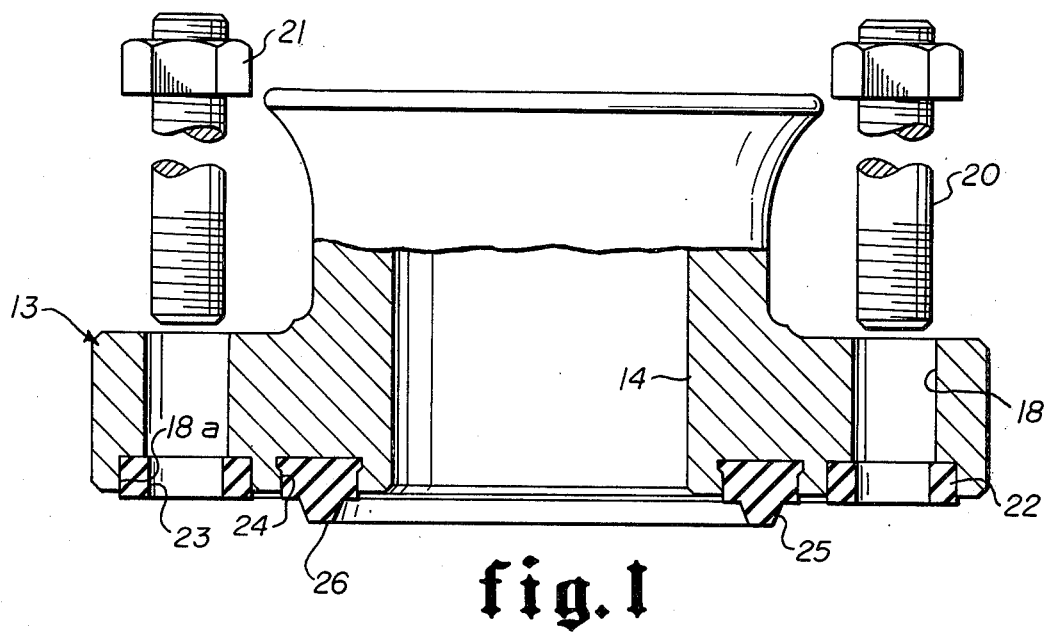
FIG. 1 is a vertical sectional view of a bell flange constructed in accordance with the first-described embodiment of the invention.

When a bell flange, as indicated in its entirety in FIGS. 1 to 3 by reference character 13, is connected to the upper end of the preventer flange, as shown in FIGS. 2 and 3, its bore 14 forms an upward continuation of the preventer bore 11. Thus drilling mud flowing upwardly through the bore 11 continues to flow upwardly through the bore 14 of the bell flange and out its upper end to atmosphere. Consequently, in this environment, the connection between the bell flange and the preventer flange need only contain the fluid under relatively low hydrostatic pressure.

As shown in FIGS. 2 to 4, in a conventional annular preventer, the end face of the upper flange thereof is provided with a ring groove 15 near the bore 11 which is adapted to receive the lower end of a standard metal API ring for sealing with respect to an upper flange in order to contain high pressure. As is also conventional, an upper flange is adapted to be connected to the flange of the preventer 10 by means of studs whose lower ends are connected to a circle of tapped stud holes 16 formed concentrically about ring groove 15. As previously described, both bell flange 13, which is shown in FIGS. 1 to 3, and the flange of an upper preventer 17, wich is shown in FIG. 4, are provided with holes 18 and 19, respectively, therethrough, for receiving the studs 20. As shown, the studs are threaded on both ends, with the lower threaded end being connected to the tapped stud holes 16, and the upper threaded ends being adapted to receive a nut 21 which may be tightened so as to draw the end faces of the upper flanges toward one another, as can be seen from a comparison of FIGS. 2 and 3.

In accordance with the embodiment of the invention shown in FIGS. 1 to 3, the lower ends of stud holes 18 through the bell flange are counterbored at 18A, and the counterbores are filled with a body of resilient material 22, which may be of suitable rubber or rubber-like material or plastic. More particularly, the body is molded as an insert which is of somewhat larger outer diameter than the inner diameter of counterbore 18 so as to form a tight fit therein, and is of a length somewhat greater than that of the counterbore so that its lower end protrudes from the end face of the bell flange.

In the event less than a full circle of studs is used in connecting the bell flange to the lower annular preventer, only the bodies 22 through which such studs are to be extended are provided with bores 23, each only slightly larger than the diameter of the studs so as to fit closely thereabout as the studs are moved downwardly into connection with the tapped holes 16, as shown in FIG. 2, the remaining bodies 22 being of solid construction. In any event, upon extension of the studs through the holes, and connection of their lower ends with the tapped holes 16, the protruding lower ends of the bodies are compressed to form a tight seal both about the portion of the diameter of the stud which extends through them as well as about surrounding portions of the end face of the preventer flange 10. Of course, in the case of those bodies 22 which are of solid construction, a seal is formed over the entire lower and protruding end of the body and the opposite portion of the end face of the annular preventer.

In this embodiment of FIGS. 1 to 3, a groove 24 is formed in the lower end face of the bell flange 13 opposite the ring groove 15, and the groove 24 is filled with another body 25 of resilient material. More particularly, and as shown in FIGS. 1 to 3, the lower end of groove 24 is wider than the upper end of ring groove 15 so as to overlap it inwardly and outwardly of its inner and outer edges. Also, as in the case of the body 22, body 25 is of somewhat larger diameter than the inner diameter of groove 24 so that when molded as an insert, it may be moved tightly into the groove. Furthermore, it is longer than groove 24 so that its lower end protrudes slightly from the lower end face of the bell flange an amount approximately equal to the protrusion of the lower end of body 22. Consequently, it, like the body 22, will be compressed as the end faces of the bell flange and preventer flange are brought together. When so compressed, the inner and outer portions of the body 25 will sealably engage the annular portions of the end face of the annular preventer 10 inwardly and outwardly of the upper end of the ring groove 25 therein.

In addition, in its preferred form, body 25 includes a rib 26 which extends downwardly from its protruding lower surface, and which has tapering side walls and a lower end wall conforming generally to the bottom wall and tapering side walls of ring groove 15 so that the rib fills the groove as the end faces of the flange are brought together. More particularly, the rib 26 has a cross section which is symmetrical with but slightly larger than that of the ring groove so that the resilient material is compressed as the end faces are drawn together so as to form a tight seal not only with respect to annular portions of the end face of the annular preventer inwardly and outwardly of the ring groove 15, but also along the side and bottom walls of the ring groove.

It is also preferred that, as shown, the insert be molded with a slightly enlarged upper end for filling the slightly enlarged upper end of groove 24, thereby providing an additional anchor for the body of resilient material within the groove.

In the embodiment of the invention of FIG. 4, the flange of the uppermost preventer 17 is similar in construction to the bell flange 13 in that the lower ends of its stud holes 19 are provided with counterbores 19A, which are filled with bodies 27 of resilient material. As in the case of the bodies 22, the bodies 27 are of slightly larger outside diameter than the inside diameter of counterbores 19A so as to fit tightly therein and are of somewhat greater length so as to provide protruding lower ends so that, as the end faces of the flanges are drawn together, bodies 27 are compressed into sealing engagement about the studs 20 as well as with respect to annular portions of the end faces of the annular flange surrounding the tapped stud holes 16. In the case of the embodiment of FIG. 4, the lower ends of bodies 27 protrude a somewhat greater distance due to a standoff between the end faces when they are connected together, as will be described to follow.

As was also true of the embodiment of FIGS. 1 to 3, less than all of the bodies 27 may be provided with bores 28 therethrough of a diameter just slightly greater than that of the studs. Again, this depends on the number of studs to be used in the full circle of studs in connecting the upper flange to the lower flange.

As also previously described, in this high pressure environment, the lower end face of the upper preventer flange is provided with a ring groove 29 identical to the ring groove 15 in the upper end face of the lower annular preventer so as to receive a conventional API metal ring 30 therebetween. As well known in the art, as the end faces of the flanges are drawn together, ring 30 is tightly engaged between the ring grooves 15 and 29 to form a high pressure seal between the flanges. When this seal has been accomplished, the end faces of the flanges will be backed off from one another somewhat, as shown in FIG. 4.

From the foregoing, it will be seen that this invention is one well adapted to attain all of the ends and objects hereinabove set forth, together with other advantages which are obvious and which are inherent to the apparatus.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings, is to be interpreted as illustrative and not in a limiting sense.

The invention having been described, what is claimed is:

1. For use in protecting a blowout preventer flange having an end face with an inner ring groove and an outer circle of tapped stud holes formed about the groove, a bell flange having an end face disposable opposite the end face of the preventer flange and an outer circle of holes therethrough which are alignable with the tapped holes in the end face of the blowout preventer flange, so that studs may be extended therethrough for connecting to said tapped holes in the preventer flange in order to draw the end faces of the flanges toward one another, said end face of the bell flange having a groove formed therein disposable opposite the ring groove of the blowout preventer flange, when the end faces are so disposed, the ends of the holes being counterbored and filled with a first body of resilient material at least some of which are bored to closely receive a stud therethrough and all of which protrude from the end face of the bell flange, and said groove in the bell flange being filled with a second body of resilient material which protrudes from the end face of the bell flange and is wider than the ring groove of the preventer, so that, as said end faces are drawn together by connection of the studs to the stud holes, the first and second bodies will sealably engage, respectively, about said studs and surrounding portions of the end face of the blowout preventer flange, and with the end face of the preventer flange both inwardly and outwardly of the inner and outer edges of the groove therein.

2. For use in protecting a blowout preventer flange having an end face with an inner ring groove and an outer circle of tapped stud holes formed about the groove, a bell flange having an end face disposable opposite the end face of the preventer flange and an outer circle of holes therethrough which are alignable with the tapped holes in the end face of the blowout preventer flange, so that studs may be extended therethrough for connection to said tapped holes in the preventer flange in order to draw the end faces of the flanges toward one another, said end face of the bell flange having a groove formed therein disposable opposite the ring groove of the blowout preventer flange, when the end faces are so disposed, the ends of the holes in the bell flange being counterbored and filled with a first body of resilient material at least some of which are bored to closely receive a stud therethrough and all of which protrude from the end face of the bell flange, and said groove in the bell flange being filled with a second body of resilient material which extends from the end face of the bell flange, so that, as said faces are drawn together by connection of the studs to the stud holes, the first body of resilient material will sealably engage with the studs and surrounding portions of the end face of the blowout preventer flange, and the extension of the second body of resilient material will sealably engage with the groove in the end face of the preventer flange.

3. For use in protecting a blowout preventer flange having an end face within an inner ring groove which has a bottom wall and upwardly and outwardly tapering side walls, and an outer circle of tapped stud holes formed about the groove, a bell flange having an end face disposable opposite the end face of the preventer flange and an outer circle of holes therethrough which are alignable with the tapped holes in the end face of the blowout preventer flange, so that studs may be extended therethrough for connection to said tapped holes in the preventer flange in order to draw the end faces of the flanges toward one another, said end face of the bell flange having a groove formed therein disposable opposite the ring groove of the blowout preventer flange, when the end faces are so disposed, the ends of the stud holes being counterbored and filled with a first body of resilient material at least some of which are bored to closely receive a stud therethrough and all of which protrude from the end face of the bell flange, and said groove in the bell flange being filled with a second body of resilient material which has a rib extending from the end face of the bell flange which has tapering side walls and a bottom wall so that, as said faces are drawn together by connection of the studs to the tapped holes, the first body of resilient material will sealably engage with the studs and surrounding portions of the end face of the preventer flange, and the walls of the ribs of the second body of resilient material will sealably engage with the corresponding walls of the groove in the end face of the preventer flange.

4. A bell flange of the character defined in claim 3, wherein the second body of resilient material filling the groove in the bell flange includes protruding portions on each side of the rib thereof for sealably engaging the face of the bell flange inwardly and outwardly of the inner and outer edges of the preventer groove.

5. For use in protecting a blowout preventer flange having an end face with an inner ring groove and an outer circle of tapped stud holes formed about the groove, another preventer having a flange with an end face disposable opposite the end face of the preventer flange and an outer circle of holes therethrough which are alignable with the stud holes in the end face of the blowout preventer flange, so that studs may be extended therethrough for connection to said tapped holes in the preventer flange in order to draw the end faces of the flanges toward one another, said end face of the other flange having a ring groove formed therein disposable opposite the ring groove of the blowout preventer flange, when the end faces are so disposed, so that a seal ring may be received between the grooves, the ends of the tapped stud holes being counterbored and filled with a body of resilient material at least some of which are bored to closely receive a stud therethrough and all of which protrude from the end face of the other flange, so that, as said faces are drawn together by connection of the studs to the tapped holes, the seal ring is sealably engaged between the ring grooves and the body of resilient material will sealably engage with the studs and surrounding portions of the end face of the blowout preventer flange.

* * * * *